3,251,813
COPOLYMERS OF UNSATURATED ETHERS AND HALOGENATED UNSATURATED ETHERS AND METHOD OF PREPARING SAME
Giulio Natta, Mario Farina, and Giancarlo Bressan, Milan, Italy, assignors to Montecatini Società Generale per l'Industria Mineraria e Chimica, a corporation of Italy
No Drawing. Filed July 25, 1961, Ser. No. 128,302
Claims priority, application Italy, July 26, 1960, 13,317/60
27 Claims. (Cl. 260—80.3)

The present invention relates to copolymers of unsaturated ethers of the general formula (1) $\quad\quad\quad R-CH=CH-OR'$ wherein R is either hydrogen or an organic radical having from 1 to 16 carbon atoms and is selected from the group consisting of alkyl, alicyclic, aryl, and aralkyl and R' is a radical having from 1 to 16 carbon atoms and is selected from the group consisting of alkyl, alicyclic, aryl, and aralkyl, with halogenated unsaturated ethers of the general formula (2) $\quad\quad\quad X-CH=CH-OR''$ wherein X is a halogen atom and R" is a radical having from 1 to 16 carbon atoms and is selected from the group consisting of alkyl, alicyclic, aryl, and aralkyl. The present invention also relates to a method for preparing the above mentioned copolymers.

It is known that unsaturated ethers belonging to the class of vinyl and alkenyl ethers of the Formula 1 and to the class of the $\beta$-halo-vinyl-ethers of Formula 2 are homopolymerizable in the presence of suitable ionic catalysts in a stereospecific manner.

Surprisingly it has now been found that in the presence of suitable catalysts it is possible to copolymerize monomers defined by Formula 1 with monomers defined by Formula 2 and that high molecular weight copolymers may be obtained, which copolymers exhibit interesting chemical and physical properties, e.g., the capacity to undergo vulcanization.

The fact that the products of the instant invention are in fact genuine copolymers and not a mechanical mixture of homopolymers is clearly demonstrated by X-ray examination. In fact, if a pure monomer of either Formula 1 or 2 herein is homopolymerized under the same conditions herein specified for copolymerization, crystalline polymers are generally obtained. If the monomer is a vinyl ether, the homopolymer will have an isotactic structure; if it is an alkenyl trans ether or a $\beta$-chloro-trans, vinyl ether, then a threodiisotactic structure; if a $\beta$-chloro cis vinyl ether, an erythro-di-isotactic structure. Each such homopolymer has a characteristic X-ray diffraction pattern and is powder or fiber like.

On the contrary, X-ray analysis of the copolymer products obtained by copolymerization according to the present invention, shows such copolymers to be either only partially crystalline, i.e., when one of the monomers (able to produce a crystalline homopolymer) is copolymerized with a small percentage (for instance, less than 10 mole percent) of the other monomer; or else rubber like or oil like and amorphous (when the monomer capable of producing a crystalling homopolymer is used in an amount less than 90 mole percent). The copolymerization may be carried out within a very wide temperature range, generally from −120 to about +100° C., and preferably from about −100 to +20° C.

Among the catalysts which may be used according to the process of the present invention are compounds or mixtures of compounds having an attenuate cationic catalytic activity and selected from the group consisting of boron halides, complexed boron halides, e.g.

$$BF_3 \cdot (C_2H_5)_2O$$

halides of metal organic compounds of metals from Groups II and III of the Periodic Table, halo-alcoholates and other mixed salts of transition metals of Group IV of the Periodic Table.

Among the compounds which have shown a high catalytic activity are included boron fluoride etherate, monoethylaluminum dichloride, diethylaluminium monochloride, dichlorotitanium dibutylate, and dichloro titanium diacetate.

According to the present invention the polymerization preferably is carried out in a solvent that is inert with respect to the catalyst system, for instance, toluene, heptane, or other low-boiling hydrocarbons. When boron fluoride etherate is employed as the catalyst, other organic compounds also may be used as solvents, for instance, ethers and esters.

The catalysts is generally added to a solution in an inert solvent of the two monomers, which are previously prepared and maintained at the desired temperature. Of course, the order of addition may be varied by introducing the monomers into a solution of the catalyst.

It is known that a copolymer composition, because of different relative reactivities of its two starting monomers, is generally different from that of the mixture of the starting monomers, and that said composition generally varies as the conversion proceeds.

The subsequent examples show that the non-halogenated monomer is remarkably more reactive than the halogenated monomer. Therefore, when a copolymer having a specified composition is desired, it is necessary to employ a mixture having a halogenated monomer content higher than that which corresponds to the desired content of said monomer in the copolymer.

The composition of the monomer mixture which under stationary conditions gives a copolymer of the desired composition may be easily calculated when the relative reactivities $r_1$ and $r_2$ of the single monomers are experimentally determined.

When operating according to a batch-process it is advisable, in order to obtain a copolymer having a homogeneous composition, to start the reaction with a solution very rich in the halogenated monomer and then to add progressively a mixture of the monomers in amounts corresponding to the amount which has been polymerized for each monomer during the same period of time; this is equivalent to the addition of a mixture of the two monomers having composition and the weight equal to the weight of the copolymer thus formed. This procedure can be effected when the kinetic parameters of the reaction are known.

With a continuous process it is easier to obtain the desired stationary conditions and to obtain a homogeneous copolymer.

Due to the geometrical stereo-isomerism of some monomers to which the present invention relates, several types of copolymer are possible, according to particular combination employed. In fact, the alkenyl ethers and the $\beta$-halo-vinyl ethers exist in the cis and trans forms which can be distinctly separated and characterized.

Therefore, it is necessary to consider all the possible combinations of copolymers of vinyl ethers and of alkenyl ethers (in the two cis and trans series) both with the $\beta$-halo vinyl ethers cis and with the trans isomers, and also with the raw cis-trans mixture obtained directly from the synthesis.

The following monomers are illustrative of those which are included in Formulas 1 and 2. Monomers comprised in Formula 1 include: vinyl methyl ether, vinyl ethyl ether, vinyl propyl ether, vinyl isopropyl ether, vinyl butyl ether, vinyl isobutyl ether, vinyl cyclohexyl ether, vinyl phenyl ether, etc.; the two cis and trans series (or mixtures thereof) of propenylmethyl ether, propenyl ethyl ether, propenyl propyl ether, propenyl isopropyl ether, propenyl butyl ether, propenyl isobutyl ether, propenyl phenyl ether, propenyl cyclohexyl ether, propenyl benzyl ether, butenyl methyl ether, butenyl ethyl ether, butenyl isobutyl ether, cyclohexyl methoxy ethylene, phenyl methoxy ethylene, benzyl methoxy ethylene.

Monomers comprised in Formula 2 include: the two cis and trans series (or mixtures thereof) of $\beta$-chloro vinyl methyl ether, $\beta$-chloro vinyl ethyl ether, $\beta$-chloro vinyl propyl ether, $\beta$-chloro vinyl isopropyl ether, $\beta$-chloro vinyl butyl ether, $\beta$-chloro vinyl isobutyl ether, $\beta$-chloro vinyl phenyl ether, $\beta$-chloro vinyl cyclohexyl ether, $\beta$-chloro vinyl benzyl ether, $\beta$-bromo vinyl methyl ether, $\beta$-bromo vinyl ethyl ether, $\beta$-bromo vinyl butyl ether, $\beta$-bromo vinyl isobutyl ether, $\beta$-iodo vinyl methyl ether, $\beta$-iodo vinyl butyl ether, $\beta$-iodo vinyl isobutyl ether.

The chemical and physical properties of the copolymers vary, not only by varying either the alkoxy group, the halogen atom, or the configuration of the monomers, but also by varying the ratio between the monomeric units of the type (1) and those of the type (2) in the copolymer. In fact, depending on the ratios used, there is a gradual passage from products having characteristics of the homopolymer of one type to amorphous products having wholly different properties, to products having the characteristics of the other homopolymer. Those copolymers which have a high practical interest are those having a moderately low halide content, generally below 10% by weight and preferably from 1 to 5%, which corresponds to a fraction of monomeric units, derived from the monomers comprised in the general Formula 2, in the polymer less than 30% and preferably from about 1 to 10%.

It is believed that such copolymers, even if occasionally amorphous, still have a regular structure with respect to the alkoxy groups.

In particular, a copolymer of a vinyl ether with a $\beta$-chloro vinyl ether, this copolymer having the same alkoxy substituents (and which may be considered as derived from the vinyl ether homopolymer by substitution of chlorine atoms for hydrogen atoms in —$CH_2$— groups in the chain) exhibits, as compared with similar compounds obtained by chlorination (in solution or in the absence of solvent) of the corresponding poly-vinyl ether, remarkable differences, as for instance, the presence of chlorine atoms only in the main chain and, therefore, a more regular distribution of the chlorine atoms in the polymer.

The intrinsic viscosity (and therefore, the average molecular weight) of the copolymers may be remarkably increased by decreasing the rate of polymerization, e.g., by further lowering the polymerization temperature.

The chlorinated copolymers obtained according to the present invention represent a new class of products of remarkable technical interest. In fact, they are able to undergo vulcanization and may be converted into elastic products having very good mechanical characteristics (e.g., high ultimate tensile stress and elastic elongation), which products may be used in a wide variety of technical applications and present, as compared to diolefin elastomers, a higher stability and resistance to degradations, in particular, resistance to attack by the atmospheric agents.

*Examples 1–22*

Solutions of the monomers are introduced into a dried glass tube under nitrogen. After the desired temperature is obtained, a solution or suspension of the catalyst is added under nitrogen. A remarkable evolution of heat is generally observed.

After maintaining the mixture at constant temperature for the required time, the contents of the glass tube are poured into methanol, which cause the copolymer to coagulate. The copolymer is dried for an extended period of time under vacuum at a moderate temperature and is finally weighed.

The quantitative results are set forth in Table I, wherein $f_A$ and $f_B$ are the molar fraction of the monomers A and B in the initial solution; and $F_B$ is the molar fraction of monomeric units B in the copolymer.

The intrinsic viscosity $[\eta]$ is determined at 30° C. in toluene; the values are expressed as $\times 100$ ml./g.

TABLE I

| Example | Monomers | | | | | | | Polymerization conditions | |
|---|---|---|---|---|---|---|---|---|---|
| | Monomer A | G. | $f_A$ percent | Monomer B | | G. | $f_B$ percent | Solvent | Cc. |
| 1 | Vinylisobutylether | 1.0 | 28 | $\beta$-chlorovinylisobutylether | | 3.4 | 72 | Toluene | 55 |
| 2 | do | 2.0 | 51 | do | | 2.55 | 49 | do | 55 |
| 3 | do | 3.0 | 70 | do | | 1.7 | 30 | do | 55 |
| 4 | do | 4.0 | 86 | do | | 0.85 | 14 | do | 55 |
| 5 | Vinylbutylether | 2.0 | 89 | $\beta$-chlorovinylbutylether-cis | | 0.35 | 11 | do | 30 |
| 6 | do | 2.0 | 80 | do | | 0.70 | 20 | do | 30 |
| 7 | do | 2.0 | 66 | do | | 1.40 | 34 | do | 30 |
| 8 | do | 0.5 | 20 | do | | 2.75 | 80 | do | 30 |
| 9 | Vinylisobutylether | 3.5 | 93 | $\beta$-chlorovinylisobutylether-trans | | 0.35 | 7 | do | 45 |
| 10 | do | 6.0 | 81 | $\beta$-chlorovinylisobutylether-cis | | 1.9 | 19 | do | 45 |
| 11 | Methylisobutoxyethylene cis | 3.0 | 88 | $\beta$-chlorovinylisobutylether-trans | | 0.5 | 12 | do | 45 |
| 12 | Methylisobutoxyethylene trans | 0.85 | 87 | do | | 0.15 | 13 | do | 25 |
| 13 | do | 1.20 | 78 | $\beta$-chlorovinylisobutylether-cis | | 0.4 | 22 | do | 25 |
| 14 | Methylisobutoxyethylene cis | 3.05 | 79 | do | | 0.95 | 21 | do | 45 |
| 15 | Vinylbutylether | 2.0 | 80 | $\beta$-chlorovinylisobutylether-cis | | 0.70 | 20 | do | 40 |
| 16 | Vinylisobutylether | 3.0 | 80 | $\beta$-chlorovinylisobutylether-cis | | 1.0 | 20 | do | 20 |
| 17 | do | 3.0 | 81 | do | | 0.95 | 19 | do | 30 |
| 18 | do | 4.0 | 84 | do | | 1.0 | 16 | Diethylether | 30 |
| 19 | do | 4.0 | 84 | do | | 1.0 | 16 | Ethylacetate | 30 |
| 20 | do | 4.0 | 84 | do | | 1.0 | 16 | Heptane | 25 |
| 21 | do | 5.6 | 84 | do | | 1.4 | 16 | Toluene | 25 |
| 22 | do | 34.4 | 84 | do | | 8.6 | 16 | do | 250 |

TABLE I—Continued

| Example | Polymerization conditions | | | | Copolymer | | | | |
|---|---|---|---|---|---|---|---|---|---|
| | Catalyst | Cc. | T., °C. | Duration, h. minutes | Polymer, g. | Conversion, percent by weight | Cl in the polymer, percent by weight | $f_B$ percent | $(\eta)$ |
| 1 | $AlCl_2C_2H_5$ | 0.1 | −75 | 0 45 | 0.29 | 6.5 | 10.4 | 32 | N.D. |
| 2 | $AlCl_2C_2H_5$ | 0.1 | −75 | 0 45 | 0.50 | 11 | 5.9 | 17 | N.D. |
| 3 | $AlCl_2C_2H_5$ | 0.1 | −75 | 0 45 | 1.27 | 27 | 2.1 | 6 | 0.27 |
| 4 | $AlCl_2C_2H_5$ | 0.1 | −75 | 0 45 | 1.86 | 38.5 | 1.1 | 3 | 0.3 |
| 5 | $AlCl_2C_2H_5$ | 0.05 | −75 | 0 15 | 1.11 | 47 | 0.7 | 2 | N.D. |
| 6 | $AlCl_2C_2H_5$ | 0.05 | −75 | 0 30 | 0.91 | 34 | 1.0 | 3 | N.D. |
| 7 | $AlCl_2C_2H_5$ | 0.05 | −75 | 1 15 | 0.83 | 25 | 2.0 | 6 | N.D. |
| 8 | $AlCl_2C_2H_5$ | 0.05 | −75 | 2 30 | 0.06 | 2 | 11.0 | 35 | N.D. |
| 9 | $AlCl_2C_2H_5$ | 0.05 | −75 | 0 20 | 2.38 | 62 | 0.15 | 0.5 | N.D. |
| 10 | $AlCl_2C_2H_5$ | 0.05 | −75 | 0 30 | 3.65 | 46 | 2.5 | 7 | N.D. |
| 11 | $AlCl_2C_2H_5$ | 0.05 | −75 | 2 20 | 2.8 | 80 | 0.2 | 0.6 | N.D. |
| 12 | $AlCl_2C_2H_5$ | 0.05 | −75 | 2 30 | 0.72 | 72 | 0.3 | 1.0 | 0.23 |
| 13 | $AlCl_2C_2H_5$ | 0.05 | −75 | 2 30 | 1.35 | 84 | 4.25 | 14 | 0.28 |
| 14 | $AlCl_2C_2H_5$ | 0.05 | −75 | 2 | 2.88 | 72 | 0.4 | 1.3 | N.D. |
| 15 | $BF_3(C_2H_5)_2O$ | 0.2 | −75 | 1 15 | 2.13 | 79 | 3.6 | 10 | 0.29 |
| 16 | $TiCl_2(OC_4H_9)_2$ | 0.5 | +20 | 15 | 0.48 | 12 | 3.0 | 9 | N.D. |
| 17 | $Al(C_2H_5)_2Cl$ | 0.1 | −40 | 20 | 1.55 | 39 | 2.4 | 6.5 | 0.21 |
| 18 | $BF_3(C_2H_5)_2O$ | 0.1 | +20 | 80 | 3.1 | 62 | 3.3 | 9.3 | N.D. |
| 19 | $BF_3(C_2H_5)_2O$ | 0.1 | +20 | 80 | 0.6 | 12 | 3.7 | 10.7 | N.D. |
| 20 | $AlCl_2C_2H_5$ | 0.1 | −75 | 0 50 | 1.75 | 35 | 2.3 | 6.3 | N.D. |
| 21 | $AlCl_2C_2H_5$ | 0.1 | −90 | 0 30 | 3.1 | 44 | 2.2 | 6 | 0.36 |
| 22 | $AlCl_2C_2H_5$ | 0.8 | −75 | 19 | 30.6 | 72 | 2.4 | 6.7 | 0.27 |

Variations can, of course, be made without departing from the spirit of this invention.

Having thus described this invention, what is desired to be secured and is hereby claimed is:

1. Linear amorphous copolymers of two unsaturated ether monomers having chlorine directly attached to the main chain, one of these monomers defined by the formula R—CH=CH—OR' wherein R is a member selected from the group consisting of hydrogen, $CH_3$ and $C_2H_5$ and R' is an alkyl group having from 1 to 4 carbon atoms; the second of these monomers being an unsaturated halogenated ether defined by the formula

X—CH=CH—OR'' wherein X is chlorine and R'' is an alkyl group having from 1 to 4 carbon atoms.

2. The copolymer of claim 1 wherein the monomeric units derived from the unsaturated halogenated ether are present in the copolymer in a molar fraction less than 30%.

3. The copolymer of claim 2 wherein the monomeric units derived from the unsaturated halogenated ether are present in the copolymer for a molar fraction between 1 and 10%.

4. The copolymer of claim 1 wherein R is methyl.
5. The copolymer of claim 1 wherein R' is butyl.
6. The copolymer of claim 1 wherein R' is isobutyl.
7. The copolymer of claim 1 wherein R'' is butyl.
8. The copolymer of claim 1 wherein R'' is isobutyl.
9. A copolymer according to claim 1 of vinyl-isobutyl ether and β-chloro vinyl isobutyl ether.
10. A copolymer according to claim 1 of vinyl isobutyl ether and β-chloro vinyl isobutyl ether cis.
11. A copolymer according to claim 1 of vinyl isobutyl ether and β-chloro vinyl isobutyl ether trans.
12. A copolymer according to claim 1 of vinyl butyl ether and β-chloro vinyl butyl ether cis.
13. A copolymer according to claim 1 of methyl isobutoxy ethylene cis and β-chloro vinyl isobutyl ether cis.
14. A copolymer according to claim 1 of methyl isobutoxy ethylene cis and β-chloro vinyl isobutyl ether trans.
15. A copolymer according to claim 1 of methyl isobutoxy ethylene trans and β-chloro vinyl isobutyl ether trans.
16. A copolymer according to claim 1 of methyl isobutoxy ethyl trans and β-chloro vinyl isobutyl ether cis.
17. A process for the preparation of copolymers of claim 1 comprising copolymerizing the two monomers at a temperature from about −120° to +100° C. in the presence of an effective amount of a catalyst comprising a compound selected from the group consisting of boron halides and complexes thereof, halides of organometallic compounds of metals belonging to Groups II and III of the Periodic Table, and halogeno-alcoholates of transition metals belonging to Group IV of the Periodic Table.

18. The process of claim 17 wherein the copolymerization is carried out at a temperature of from about −100° to +20° C.

19. The process of claim 17 wherein the copolymerization is carried out in the presence of a solvent which is inert with respect to the catalytic system and is selected from the group consisting of aliphatic and aromatic hydrocarbons, ethers, and esters.

20. The process of claim 19 wherein the inert solvent is toluene.

21. The process of claim 19 wherein the inert solvent is heptane.

22. The process of claim 19 wherein the inert solvent is diethyl ether.

23. The process of claim 19 wherein the inert solvent is ethyl acetate.

24. The process of claim 17 wherein the catalyst is monoethyl aluminum dichloride.

25. The process of claim 17 wherein the catalyst is a compound having the formula $BF_3(C_2H_5)_2O$.

26. The process of claim 17 wherein the catalyst is a compound of the formula $TiCl_2(OC_4H_9)_2$.

27. The copolymer of claim 1 in vulcanized form.

References Cited by the Examiner

UNITED STATES PATENTS 3,025,275  3/1962  Heck _____ 360—80.3

FOREIGN PATENTS 571,741  4/1958  Italy.

OTHER REFERENCES

Schwan et al., J. Polymer Science 40, 457–468 (1959).
Shostakovskii et al., C.A. 45, 2851 i (1951).

JOSEPH L. SCHOFER, *Primary Examiner.*

JOSEPH R. LIBERMAN, JAMES A. SEIDLECK,
*Examiners.*